United States Patent [19]

Waikas

[11] Patent Number: 4,747,215

[45] Date of Patent: May 31, 1988

[54] ELECTRONIC TAPE MEASURE

[76] Inventor: Jack Waikas, 1664 Roselawn Ave., Schenectady, N.Y. 12306

[21] Appl. No.: 933,980

[22] Filed: Nov. 24, 1986

[51] Int. Cl.$^4$ .............................................. G01B 3/10
[52] U.S. Cl. ....................................... 33/140; 377/18
[58] Field of Search .......... 33/138, 139, 140, DIG. 1; 235/493; 377/18

[56] References Cited

U.S. PATENT DOCUMENTS

| 3,375,590 | 4/1968 | Quenot .................................. 33/138 |
| 4,185,390 | 1/1980 | Tateishi ................................. 33/139 |
| 4,316,081 | 2/1982 | Washizuka et al. .................. 33/139 |
| 4,574,486 | 3/1986 | Drechsler ............................. 33/138 |

FOREIGN PATENT DOCUMENTS

| 122103 | 9/1980 | Japan ..................................... 33/139 |
| 156517 | 9/1982 | Japan ............................. 33/DIG. 1 |
| 235009 | 11/1985 | Japan ..................................... 33/140 |

*Primary Examiner*—William A. Cuchlinski, Jr.
*Assistant Examiner*—Patrick R. Scanlon
*Attorney, Agent, or Firm*—Martin J. Spellman, Jr.

[57] ABSTRACT

An electronic measuring rule wherein the rule tape is formed integrally with a magnetic recording tape imbedded therein along the longitudinal axis of the tape rule. The recording tape which has spaced indicia signals recorded thereon is molded into a recess along the longitudinal center of a vinyl tape so that the vinyl tape covers the outer edges of the magnetic recording tape and the back thereof. A thin protective resin layer covers the recorded side to protect it from abrasions during use. Visible indicia are printed on both sides of the vinyl tape, top and bottom, on each lateral side so that the tape may be "read" visually in the usual manner from either lateral side, both top and bottom.

The recording tape portion of the measuring rule is "read" directly by a pick-up head located within the case adjacent the location where the tape exits the enclosing case.

An on-off switch turns on the calculator and display portion when the tape is pulled from the case, and off when less than an inch of the tape is extened. Their magnetic readings are converted to digital display.

4 Claims, 2 Drawing Sheets

ID="4,747,215"

ELECTRONIC TAPE MEASURE

BACKGROUND OF THE INVENTION

1. Field of the Invention

This invention relates to electronic linear tape measures or rules, and more particularly to an electronic tape measure which provides an easily read digital display of the length measured by the tape alone or the tape plus the length of a side of the body of the measuring tape container or body in the instance where an internal measurement is to be determined.

2. Prior Art

Electronic tape measures have been available for a number of years. In many devices the length measured or read, has been determined by first mechanically tracking the length of tape unwound from the storage reel within the measure body by counting mechanical links in the tape with a sprocket wheel and converting to electronic pulses. The sprocket wheel drives a shaft which in turn has a wheel at its opposite end with optic, magnetic or some other indicia thereon for reading by an appropriate sensor and conversion to electronic pulses ultimately for display, memory storage, or use in calculations. Such measuring rules tend to be unreliable and not as accurate as they might be because of the multiple mechanical links between the tape and the electronic sensor and calculator portions of the device. Each such link is susceptible to breakage, play, and therefore inherent inaccuracy of the reading displayed, stored, or utilized in calculations results. An example of this type of device is disclosed in U.S. Pat. No. 4,186,490, Quenot.

An involved mechanical linkage is also utilized in U.S. Pat. No. 4,031,360, Soule wherein the tape is fabricated of joined individual links which mesh with teeth on a sproket wheel, which in turn is connected to a shaft, which at the other end has a sprocket gear that as the shaft turns in relation to movement of the linked "tape", mechanically actuates a switch to, in turn, generate pulses for the electronic portion of the device.

In U.S. Pat. No. 4,185,390, Tateishi a photosensor is used and has inherent problems in functioning such as providing sufficient light and the fact that visible indicia on the tape are often partially obscured by dirt picked up in use.

U.S. Pat. No. 4,316,081, Washizuka et al, senses the passage of spaced magnetic balls imbedded in a "tape." The balls are mounted on a thin thread such as would be done in making a pearl necklace. There are thus no visible indicia available on the "tape" for direct reading which is of course a great disadvantage.

SUMMARY OF THE INVENTION

The present invention provides a simple, compact, and inexpensive electronic measuring tape having both a high degree of accuracy and excellent reliability and durability.

The prior devices discussed above rely upon a variety of often complex mechanical structures to translate tape movement or position to an electronic or optical sensor and thence to electric impulses to convert to a digital display after electronic processing.

Such systems are inherently less accurate and subject to failure due to the routine rough handling to which most measuring rules are normally subjected.

The measuring rule of the present invention eliminates those difficulties and provides an electronic measuring rule that is simpler and more reliable in construction and inherently more accurate.

This is accomplished primarily due to forming the rule tape integrally with a magnetic recording tape imbedded therein or coated adhesively along the longitudinal axis of the tape rule. The recording tape on which spaced indicia signals previously have been recorded preferably is molded into a recess of the vinyl along the longitudinal center of a vinyl tape in such a manner that the vinyl tape covers the outer edges of magnetic recording tape and the back thereof.

The vinyl tape supports the back of the magnetic tape, i.e. the non-recorded side and a thin protective resin layer covers the recorded side to protect it from abrasions during use. The magnetic tape has signals spaced every 1/16 of an inch or even 1/64 if such fine gradiation is desired. Since the embedded magnetic tape is not very wide compared to the vinyl carrier tape, visible indicia may be printed on both sides of the vinyl tape, top and bottom, and on each lateral side so that the tape may be "read" visually in the usual manner from either lateral side, both top and bottom. This is not possible with prior art devices such as the digital tape in U.S. Pat. No. 4,316,081, Washizuka which employs a thin tube filled with magnetic balls nor, the chain or sprocket link arrangment of U.S. Pat. No. 4,031,360 Soule.

The recording tape portion of the measuring rule of this invention is "read" directly by a pick-up head located within the case adjacent the location where the tape exits the enclosing case. Any intervening mechanical linkage therefore is not necessary.

A pair of felt wipers before the pick-up head assures that the magnetic tape is free of any debris which might interfere with the pick-up of recorded indicia signals.

An on-off switch turns on the calculator and display portion when the tape is pulled from the case, and off when less than an inch of the tape is extended is provided.

The circuitry and memory of the calculator aspect of the rule of the present invention is routine and are well within the knowledge of those skilled in the art. The magnetic readings are converted to digital display in the usual manner and each reading may of course be stored and a series of measurements totaled and/or one subtracted from another. It is understood that the measurements taken by the rule could be converted to other units depending upon the extent of computing circuitry one desires in any particular model. Provision may also be made for an audible signal to sound whenever the memory button is pushed and/or a preset dimension is reached. A basic automatic function is to add a dimension equal to the case side when doing interior measurements. A further feature that may be added if desired is additional circuitry to reverse the orientation of the display so the convenience of left or right handed use is available.

The term vinyl encompasses any flexible plastic material non-mettalic in nature and capable of accepting printing. Suitable examples are

BRIEF DESCRIPTION OF THE DRAWING

In the accompanying drawing which forms a part of this specification.

DESCRIPTION OF PREFERRED EMBODIMENT

Figure 1:
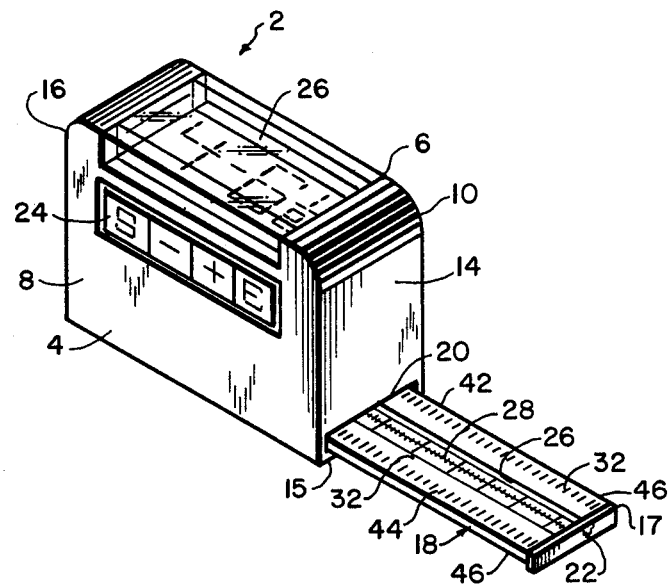
FIG. 1 is a perspective view of a measuring rule embodying the present invention.
Figure 2:
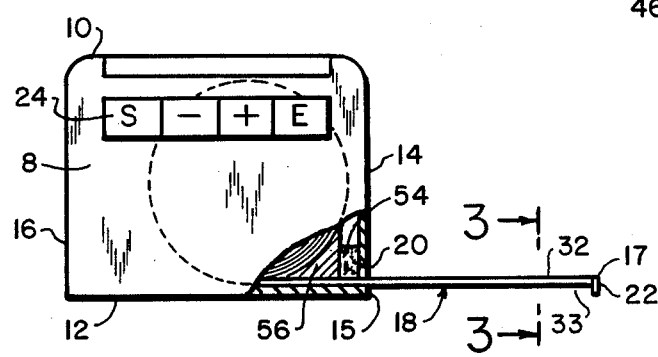
FIG. 2 is a side view of the tape rule with the case side partially cut away.

Referring to the accompanying drawing, FIG. 1 shows an overall view of a measuring rule 2 according to the present invention comprising an enclosure case 4 having sides 6 and 8, a top 10, bottom 12, front end 14, and rear end 16. At the base 15 of the front 14 is a lateral slot 20 through which the tape 18 exits from its reeled position within the case 4. The end 17 of the tape 18 is provided with the usual metallic clip 22 to prevent the end 17 from entering the case 4 and also to provide a finger grasp for pulling the tape 18 from the case 4. On side 8 of the case 4 there is provided a number of control buttons 24 for entering integers, adding, subtracting, dividing and multiplying instructions in the embodiment described.

It is understood that different arrangements can be made depending upon the degree of sophistication in particular products as far as which calculating functions may be desired. For instance, The present invention is not directed to the calculator aspect per se, since this is known in the art of calculators used for engineering which determine areas, total lengths, and cubic volumes, conversion of units and the like.

As shown in FIG. 1 the top 10 of the storage case 4 is provided a digital display 26 of a known type of LED with seven segments. In the present embodiment, the display 26 reads in feet, inches, and fractions of inches down to the 64th of an inch.

Figure 3:
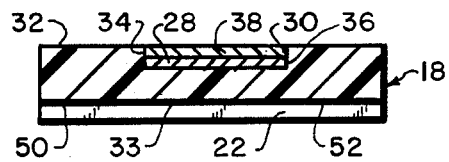
FIG. 3 is a cross-sectional view of the measuring tape along line 3—3 of FIG. 2.

In FIG. 3 a cross section of the tape 18 is shown. It is understood that the tape 18 may be comprised of any suitable nonmetallic plastic material having sufficient strength and flexibility for the intended purpose including a textile material enforced with a vinyl plastic that is suitable for printing the usual visual indicia thereon.

As shown in the drawing, a magnetic recording tape 28 is embedded within a longitudinal recess 30 on the top surface 32 of the tape 18 structure as shown best in FIG. 3. The depth 34 of the recess 30 is slightly greater than the thickness 36 of the magnetic tape 28 embedded therein so a protective resin film 38 may be placed on the top surface 32 of the tape 18 to protect the recording surface 40 of the embedded magnetic tape 28 from gross abrasions during use.

As shown in FIG. 3, the edges 42 and 44 of the top surface 32 of the tape 18 are printed with normal indicia 46 of measuring tapes so that the tape 18 may be read from either side. The bottom 33 of the tape 18 is similarly provided with opposing complimentary indicia 50 and 52 so the tape 18 may be utilized either from the right or the left side and on the top 32 or bottom 33 surfaces.

As the tape 18 enters the case 4 it is cleaned by felt wipers 54 to remove debris from the surface 40 of surface magnetic tape 32 and thereafter passes under the magnetic sensing head 56 which senses magnetic indicia of a 1/64 of an inch spacing.

Figure 4:
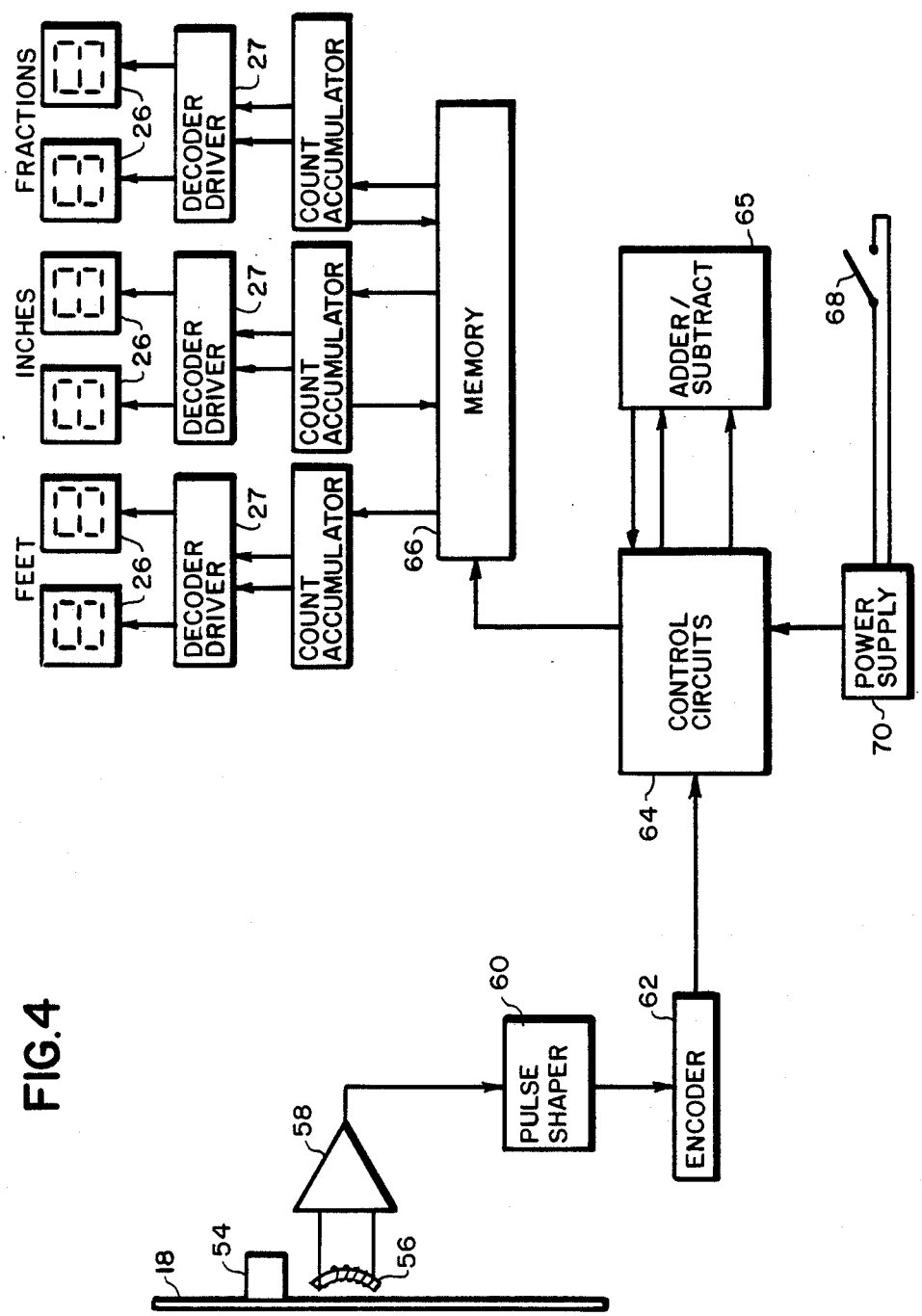
FIG. 4 is a schematic of the basic circuitry which may be used.

Thereafter, referring to FIG. 4 showing the circuit diagram, magnetic pulses are amplified by an amplifier 58, then sent to the pulse shaper 60, the encoder 62 and passed to the control circuit 64. The information may be stored in memory 66 and later (or immediately) passed on to display 26 through decoders 27. The inputs and control 65 for adding, substracting and multiplying and dividing in a known manner may be added to the extent desired. An on-off switch 68 is actuated "on" when the tape 18 is pulled out at least one inch and "off" when the tape is extended less than one inch.

As is apparent, the tape measure 2 of the present invention is essentially free from exposure to mechanical breakdown as other types of electronic rules have been in the past.

Circuits are provided for adding or substracting information equivilant to the length of one side of the case in the event that interior measurements are to be made as is known in the art. A typical distance would be from 2 to 3 inches.

Another feature which may be useful is the ability to invert the display to read it from the opposite side wherein the user normally uses the tape as a left-handed person. An important feature is that the tape can be visibly read from either side as opposed to most electronic tapes known to the prior art which employ magnetic balls in the tube or sprocket links wherein the tape cannot be read except through the electronic display which is often inconvenient or impossible depending upon the actual circumstances of use.

Although the invention has been described by reference to an illustrative embodiment, it is not intended that the novel device be limited thereby, but that modifications thereof are intended to be included as falling within the broad spirit and scope of the foregoing disclosure, the following claims and the appended drawings.

What is claimed is:

1. An electronic tape linear measuring device comprising a case, a flexible tape, means within said case for winding and unwinding said tape, said case also enclosing electronic calculator means, said calculator means connected to an electronic digital display viewable on the exterior of said case, magnetic sensing means operatively connected to said calculator means and capable of sensing the length of said flexible tape extending from said case, said sensing means within said case and adjacent said flexible tape as it exits said case, said tape comprising a nonmetallic plastic material, having a top surface and a bottom surface, a recess along the longitudinal axis in the top surface of said tape, a magnetic recording tape molded in said recess with the recording surface on top thereof and slightly before the level of the top surface of said flexible tape, said magnetic recording tape having recorded therein spaced length units for sensing by said sensing head to thereby determine the length of the measuring tape extended from said case.

2. A device as claimed in claim 1 wherein said measuring tape has indicia printed thereon for visually reading the length of the tape extended.

3. A device as claimed in claim 2 wherein said indicia are printed on both sides of said measuring tape.

4. A device as claimed in claim 1 wherein said magnetic tape has a thin film of protective resin on the top surface thereof.

* * * * *